2,817,653
SULFUR-CONTAINING POLYMERS

Edward L. Cole, Newburgh, and William E. Skelton, Beacon, N. Y., assignors to The Texas Company, New York, N. Y., a corporation of Delaware No Drawing. Application April 27, 1950
Serial No. 158,588

11 Claims. (Cl. 260—139)

This invention relates to novel sulfur-containing synthetic lubricants and a process for preparing them. More particularly, this invention discloses a novel polymerization process whereby there are prepared novel sulfur-containing synthetic lubricants characterized by extreme pressure, anti-corrosive and anti-varnishing properties.

In accordance with the process of this invention, novel sulfur-containing synthetic lubricants are prepared by polymerizing olefins with hydrogen sulfide in the presence of a polymerization catalyst. The novel sulfur-containing polymers produced by polymerization of an olefin with hydrogen sulfide possess a substantial sulfur content and are good synthetic lubricants per se and are excellent lube oil blending agents since they impart desirable characteristics to lubricant compositions. Alpha-olefins are the preferred charge stock for the preparation of the sulfur-containing compounds of this invention, although other olefins may be employed. Particularly preferred polymerization catalysts are hydrogen fluoride, aluminum chloride and hydrogen fluoride-boron fluoride.

It is well known that sulfurized oils and sulfur-containing additives impart desirable anti-corrosive, and extreme pressure characteristics to lubricant compositions. Sulfurized oils have been employed per se as extreme pressure lubricants and are particularly useful as cutting oils. In the past these sulfurized oils and sulfur-containing additives have been prepared by the reaction of sulfur donors, such as phosphorous pentasulfide, potassium sulfhydryl, sulfur itself, and hydrogen sulfide, on petroleum fractions boiling in the lubricating oil range and possessing active groups, such as a double bond, a halogen atom, a hydroxyl group, etc. These former methods of preparing sulfurized oils or sulfur-containing additives are restricted by the availability of lubricant fractions containing a requisite active group. The process of this invention provides a method for preparing sulfur-containing polymers by a simple process employing readily available reactants, such as gaseous olefins and olefins boiling in the gasoline or gas oil range.

The sulfur-containing polymers produced in the process of this invention vary considerably among themselves in properties depending upon the nature of the olefin reactant, the conditions of polymerization and the type of polymerization catalyst employed. The wide variation in properties of the sulfur-containing polymers is one of the outstanding features of the process of this invention. The polymers can be "tailor-made" to specification depending upon the use for which the compound is designed. Thus, if a sulfur-containing additive is desired, a sulfur-containing polymer having the desirable property of being a V. I. improver in addition to possessing extreme pressure and anti-corrossive properties is obtained by polymerizing isobutylene with hydrogen sulfide employing aluminum chloride as a catalyst. On the other hand, if a sulfur-containing base for a cutting oil is desired, the polymerization of synthetic gas oil olefin with $H_2S$ employing HF as a catalyst results in the formation of an excellent cutting oil base. It will be recognized, however, that all of the novel sulfur-containing polymers produced in the polymerization process of this invention possess excellent anti-corrosive characteristics.

All olefins from gaseous ethylene to liquid olefins in the gas oil range can be used as a charge material in the polymerization process of this invention. Alpha-olefins constitute a particularly preferred group of reactants; the production of synthetic fuel by the catalytic conversion of carbon monoxide and hydrogen provides a large source of alpha-olefins, both gaseous and liquid. The process of the invention is applicable to olefins ranging from gaseous olefins, such as ethylene and propylene to high molecular liquid fractions, such as gas oil fractions and propylene polymer.

The novel polymerization process of this invention whereby sulfur-containing polymers are obtained can be effected with conventional polymerization catalysts. However, it has been observed that optimum results are obtained with hydrogen fluoride, aluminum chloride and hydrogen fluoride-boron fluoride.

The temperature conditions employed in the polymerization of olefins with hydrogen sulfide varies with the catalyst and with the olefin employed as a charge stock. In general, temperatures between —50° F. and 250° F. can be employed for the polymerization process. When hydrogen fluoride is employed as a catalyst, temperatures between 20° and 200° F. are used whereas with aluminum chloride it is advisable to employ temperatures below about 150° F. and preferably between —50° F. and 130° F. Temperatures as high as 250° F. can be employed with hydrogen fluoride-boron fluoride, but temperatures between 30° F. and 150° F. are usually employed. As a general rule, higher temperatures are employed for higher molecular weight olefins than are employed for lower molecular olefins using the same catalyst.

Pressures ranging from sub-atmospheric to super-atmospheric pressures of 20 atmospheres can be employed in the polymerization. Atmospheric pressure is recommended for polymerization of liquid olefins and autogenous pressure for polymerization of gaseous olefins.

Hydrogen sulfide may be employed in the reaction mixture in the proportion of 2 to 40 weight percent of the olefin charged, but ordinarily constitutes less than about 25 weight percent of the olefin charged. Indeed in most polymerizations the hydrogen sulfide constitutes approximately 3 to 15 weight percent of the olefin charged.

The sulfur content of the polymers produced by the process of this invention varies from about one weight percent to approximately 15 weight percent. Usually the sulfur content constitutes about 1.5 to 4.5 weight percent of the total polymer. However, polymers containing as high as 15 weight percent sulfur can be obtained by the polymerization of gaseous olefins, such as ethylene and isobutylene with hydrogen sulfide, in accordance with the process of this invention. Moreover, the polymers isolated from the polymerization sludge ordinarily contain a higher percentage of sulfur than do the polymers isolated from the oil layers.

The novel sulfur-containing polymers are characterized by extreme pressure and excellent anti-corrosive characteristics. In addition, some of the polymers are V. I. improvers. In the ensuing examples, wherein the preparative procedure and properties of the novel sulfur-containing polymers are detailed, particular stress will be placed upon these properties of the polymers. The extreme pressure properties will be demonstrated by the response of the sulfur-containing polymers to the well-known Four-ball Mean Hertz Load test. The anti-corrosive properties of the polymers will be established by their response to the copper strip test, to the McCoull corrosion test, and to the Toettcher varnish test, a description of which follows immediately hereafter. In the Toettcher varnish test, which was recently developed in this laboratory to evaluate the varnish-forming tendencies of either inhibited or uninhibited lubricating oils, there is employed the McCoull corrosion machine modified by the elimination of micarta bushings, Cu—Pb bearing specimen and copper baffles, and by the addition of a Pyrex glass cylinder and a smaller size copper baffile. 140 ml. of test oil is added to each beaker containing a base plate to which is attached a smaller copper baffle on a glass ring; the oil is stirred in the beaker for 13 hours at 350° F.; at the conclusion at this time the tared glass ring is removed, rinsed in precipitation naphtha, oven-dried at 220° F. for three to four hours, placed in a desiccator to cool to room temperature and reweighed. The increase in weight of each ring indicates the amount of varnish deposited and the following scale is used as a criterion.

| Increase in Weight, Mgs. | Remarks |
| --- | --- |
| 1-4 | Low Varnish. |
| 5-8 | Low-Medium Varnish. |
| 9-16 | Medium Varnish. |
| 17-24 | Medium-Heavy Varnish. |
| 25 and Over | Heavy Varnish. |

The following examples illustrate the procedure employed to prepare the novel sulfur-containing polymers and also their properties. Olefins from gaseous propylene to olefin-rich gas oil obtained by catalytic conversion of carbon monoxide and hydrogen are employed as the charge materials for the preparation of sulfur-containing polymers in the following examples. It will be observed that a wide variety of sulfur-containing polymers are prepared by varying the olefin charge and the catalyst.

Example I

Propylene in the amount of 675 g. and 60 g. of hydrogen fluoride were charged to a side-stirred reactor wherein the mixture was stirred for 32 hours and allowed to settle over a week-end at a temperature between 40 and 60° F. To this mixture 447 g. of hydrogen fluoride and 98 g. of hydrogen sulfide were added and the total mixture stirred for three hours at 100° F. Both top and bottom layers were contacted with 5 percent caustic solution, water-washed and distilled. After removal of low boiling material, distilling up to about 300° F. at 5 mm., there was obtained a liquid fraction constituting about 15 percent by weight of the propylene charged. This liquid fraction contained 1.52 percent sulfur and had the characteristic of a heavy oil having kin. vis. of 124.9 and 9.40 at 100 and 210° F., respectively; this fraction had a V. I. of 33 and a solid point of −20° F. This fraction had excellent anti-varnish properties as illustrated by 0.6 mg. varnish deposit in Penn State oxidation test modified to allow the use of smaller samples.

Example II 45 g. of hydrogen fluoride was added with stirring at 65° F. to 872 g. of an olefin-rich naphtha fraction, distilling between 117° F. and 393° F., which was obtained by the catalytic conversion of carbon monoxide and hydrogen. After the mixture of olefin and hydrogen fluoride had been mixed at approximately 75° F. for two hours, there was added 341 g. of hydrogen fluoride and the mixture stirred for an additional half hour. 100 g. of hydrogen sulfide was added to the reaction mixture which was then stirred for an additional three hours. The two layers were separated, separately neutralized with caustic, and separately distilled to 310° F. at 5 mm. in order to remove relatively low boiling material. The top layer oil amounted to 51.9 weight percent of the olefin charged. This oil fraction analyzed 3.63 weight percent sulfur and had kin. vis. of 56.6 and 6.59 at 100 and 210° F. respectively, and a V. I. of 65. The polymer had a solid point of −40° F. and gave a carbon residue of 0.05 weight percent. The excellent anti-corrosive properties of this polymer were exhibited in the McCoull corrosion test at 350° F.; after ten hours there was a 5 mg. gain in the bearing and no undissolved sludge was obtained; after test, the oil showed a neut. number of 0.17 and had a kin. vis. of 9.98 at 210° F. The polymer obtained by polymerization of synthesis naphtha with hydrogen sulfide employing a HF catalyst also exhibited good anti-oxidant properties, as illustrated in the modified Penn State oxidation test; 5 mg. of varnish were deposited, 100 ml. of oxygen were adsorbed and the tested oil had a neut. number of 14.8. This polymer is used as an additive to prevent corrosion and oxidation and is also a good component of cutting oils.

Example III

Hydrogen fluoride was added slowly at 35° F. to a side-stirred reactor containing 230 g. of an olefin-rich gas oil fraction which boiled between 304 and 543° F. and which was obtained by the catalytic conversion of carbon monoxide and hydrogen, in such proportion that the hydrogen fluoride constituted 37.5 weight percent of the total olefin content of the fraction charged. Hydrogen sulfide in the proportion of about 4.2 weight percent of the olefin content of the charge oil was slowly added to the stirred reaction mixture and the temperature slowly raised to 75° F. The reaction mixture was maintained for a period of about two hours in the stirred reactor while the temperature rose from 35 to 75° F. The reaction mixture was separated into two phases, each of which was separately neutralized and distilled to 310° F. at 5 mm. to remove relatively low boiling material. The polymer isolated from the top layer constituted 54.2 weight percent of the olefin charged, analyzed 1.2 - s cent sulfur and had a kin. vis. of 45.4 and 6.11 at 100 and 211° F., respectively. The polymer had a V. I. of 84, gave a negative reaction in the copper strip corrosion test at 212° F. and showed a carbon residue of 0.45 percent. The anti-corrosive properties of this polymer are illustrated by the results exhibited in the Toettcher varnish test for thirteen hours at 350° F.; 1.2 mg. of varnish was deposited in thirteen hours and 0.0 mg. of undissolved sludge per 10 g. of oil was obtained; after the test the material had a neut. number of 0.9 and showed a kin. vis. at 210° F. of 8.11. This polymer can be employed as a lube oil or as an additive to impart anti-corrosive and anti-varnishing properties to a lube oil or grease.

Example IV 45 g. of aluminum chloride was added to 1,400 g. of an olefin-rich gas oil which boiled in the range of 304° F. to 543° F. and which was obtained by the catalytic conversion of carbon monoxide and hydrogen; 40 g. of hydrogen sulfide was added to the reaction mixture which was then stirred for one hour at 80° F. and six hours at 128° F. and was allowed to stand overnight at 97° F. The reaction mixture was then introduced into pentane solution. The sludge was separated from the pentane solution by decantation which was neutralized and stripped to 310° F. at 5 mm. in order to remove relatively low boiling material. There was obtained from the decanted fraction a polymer having the characteristics of a heavy oil in a yield of about 29.9 weight percent basis olefin charged; this polymer, which analyzed 3.09 percent sulfur, had a kin. vis. of 84.6 and 9.05 at 100 and 210° F. and a V. I. of 87. This polymer showed a carbon residue of 0.69 percent and a solid point of −30° F. From the sludge obtained in the polymerization there was isolated a sulfur-containing polymer in a yield of about 4.9 weight percent basis of olefin charged. The sludge oil was quite viscous, analyzed 3.94 percent sulfur, had a solid point of −50° F., a kin. vis. of 47.9 and 7.07 at 100 and 210° F., respectively, and a V. I. of 114. This sludge oil is an excellent anti-corrosive additive for a lube oil or grease.

Example V 650 g. of isobutylene and 35 g. of aluminum chloride were added to a stirred reactor and stirred for eighteen hours at approximately −30 to −60° F.; 160 g. of hydrogen sulfide were added and the reaction mixture was stirred for an additional twenty hours at 25° F. whereafter the reaction mixture was poured into pentane. The solid was separated from the reaction mixture by decantation. The pentane solution was neutralized, water-washed and distilled to 310° F. at 5 mm. The bottoms obtained on this distillation constituted 100 weight percent of the olefin charged. This polymer which analyzed 1.13 percent sulfur was a highly viscous liquid having the appearance of cold honey. This material is an excellent additive for a lube oil imparting to it V. I. improvement, and anti-corrosive and extreme pressure characteristics. The excellent additive qualities of the polymer obtained by aluminum chloride polymerization of isobutylene with hydrogen sulfide is illustrated by the properties of a composition comprising 5 weight percent isobutylene-$H_2S$ polymer and 95 percent 20 grade oil, which had a V. I. of 92. The additive-containing oil which had an over-all sulfur analysis of 0.24 weight percent had a kin. vis. of 230.5 and 28.1 at 100 and 210° F., respectively, and a V. I. of 131; the additive-containing oil gave a negative copper strip corrosion test at 212° F. The improvement effected by the presence of the isobutylene-$H_2S$ polymer on the anti-corrosive properties of the oil is illustrated in the following table wherein there are compared the results obtained in the McCoull corrosion test with the 20 grade oil alone and with the additive-containing oil.

|  | 20 Oil | 20 Oil plus Polymer |
|---|---|---|
| Weight loss, mg | 118 | 5 |
| SUS vis. at 210° F | 122.4 | 79.6 |
| Neut. Number | 13.5 | 2.2 |

As a further example of the blending characteristics, 2.5 weight percent of the polymer was blended with an 8 grade oil which had a V. I. of 95. The additive-containing oil had a kin. vis. of 45.9 and 8.63 at 100 and 210° F. respectively, and a V. I. of 147.5. The improvement effected by the presence of the isobutylene-$H_2S$ polymer on the anti-corrosive properties of the oil is illustrated in the following table wherein there are compared the results obtained in the modified Penn State oxidation test with the 8 grade oil alone and with 8 grade oil plus isobutylene-$H_2S$ polymer.

|  | 8 Oil | 8 Oil plus Polymer |
|---|---|---|
| Varnish, mg | 10.2 | 4.6 |
| Neut. Number | 3.5 | 2.1 |
| $O_2$ absorbed, millimoles | 32.1 | 15.6 |

The foregoing examples illustrate that the sulfur-containing polymers produced in the process of this invention are extremely useful as lubricants per se and as additives to impart desirable characteristics to lubricant compositions. It is also evident that a wide variety of materials may be prepared by varying the olefinic charge stock, the percentage of hydrogen sulfide reacted with the olefin and the catalyst. The process of this invention has wide application in preparing sulfur-containing polymers of varying characteristics which are useful for many different purposes in lubricant compositions.

Obviously many modifications and variations of the invention, as hereinbefore set forth, may be made without departing from the spirit and scope thereof, and therefore only such limitations should be imposed as are indicated in the appended claims.

We claim:

1. A process for preparing polymers of molecular weight in the lube oil range and higher which contain 1–15 weight percent sulfur and possess extreme pressure and anti-corrosive properties which comprises reacting a monomeric olefin in the gas oil range and lower with 2 to 40 weight percent hydrogen sulfide at a temperature between −50 and 250° F. in the presence of a Friedel-Craft catalyst.

2. A process according to claim 1 in which the hydrogen sulfide reactant comprises 3 to 15 weight percent of the olefin reactant.

3. A process according to claim 1 in which the Friedel-Craft catalyst is selected from the group consisting of aluminum chloride, hydrogen fluoride and hydrogen fluoride-boron fluoride.

4. A process according to claim 1 in which an alpha olefin is employed.

5. A process according to claim 1 in which the gas oil fraction obtained by the catalytic conversion of carbon monoxide and hydrogen is the source of olefin.

6. A process according to claim 1 in which a naphtha fraction obtained by the catalytic conversion of carbon monoxide and hydrogen is the source of olefin.

7. A process according to claim 1 in which the olefin is propylene.

8. Polymers of molecular weight in the lube oil range and higher containing 1–15 weight percent sulfur and possessing extreme pressure and anti-corrosive properties prepared by reacting a monomeric alpha olefin in the gas oil range and lower with 2 to 40 weight percent hydrogen sulfide at a temperature between −50 and 250° F. in the presence of a Friedel-Craft catalyst.

9. Sulfur-containing polymers of the type described in claim 8 in which the gas oil fraction obtained by the catalytic conversion of carbon monoxide and hydrogen is the alpha olefin source.

10. Sulfur-containing polymers of the type described in claim 8 in which a naphtha fraction obtained by the catalytic conversion of carbon monoxide and hydrogen is the alpha olefin source.

11. Sulfur-containing polymers of the type described in claim 8 in which propylene is the alpha olefin.

References Cited in the file of this patent

UNITED STATES PATENTS

| 1,798,288 | Wietzel et al. | Mar. 31, 1931 |
| 1,836,170 | Johansen | Dec. 15, 1931 |
| 2,061,019 | Carter et al. | Nov. 17, 1936 |
| 2,109,692 | Forney | Mar. 1, 1938 |
| 2,121,825 | Prutton | June 28, 1938 |
| 2,137,584 | Ott | Nov. 22, 1938 |
| 2,296,399 | Otto et al. | Sept. 22, 1942 |

FOREIGN PATENTS

| 616,521 | Great Britain | Jan. 24, 1949 |